(12) United States Patent
Johnson

(10) Patent No.: US 7,107,394 B2
(45) Date of Patent: Sep. 12, 2006

(54) APPARATUS FOR CAPTURING DATA ON A DEBUG BUS

(75) Inventor: Tyler James Johnson, Plano, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 578 days.

(21) Appl. No.: 10/402,628

(22) Filed: Mar. 28, 2003

(65) Prior Publication Data
US 2004/0193790 A1   Sep. 30, 2004

(51) Int. Cl.
*G11C 8/04* (2006.01)
(52) U.S. Cl. ..................................... 711/110
(58) Field of Classification Search ............... 711/109, 711/110, 118, 100, 167, 219; 714/34, 35, 714/36; 712/227, 228
See application file for complete search history.

(56) References Cited

U.S. PATENT DOCUMENTS

| | | | | |
|---|---|---|---|---|
| 3,959,588 A * | 5/1976 | Kelly et al. | ............ | 375/356 |
| 5,574,732 A | 11/1996 | Hsieh et al. | ............ | 371/27 |
| 6,158,023 A * | 12/2000 | Ubukata et al. | ............ | 714/35 |
| 6,625,684 B1 * | 9/2003 | Casey et al. | ............ | 710/316 |
| 6,772,269 B1 * | 8/2004 | Kaganoi | ............ | 710/310 |

FOREIGN PATENT DOCUMENTS

GB    2320 774    7/1998

OTHER PUBLICATIONS

Examination Report Under Section 18(3) dated Jul. 28, 2005; 2 pages.
Search Report under Section 17 in GB0405431.8 from the UK Patent Office (date of search Jul. 15, 2004), 1 page.
Bart Vermeulen and Sandeep Kumar Goel, "Design for Debug: Catching Design Errors in Digital Chips", IEEE Design & Test of Computers; May-Jun. 2002; pp. 37-45.

* cited by examiner

*Primary Examiner*—Donald Sparks
*Assistant Examiner*—Jared Rutz

(57) ABSTRACT

In one embodiment, an apparatus is disclosed for capturing data on a debug bus comprising N registers connected in a ring, wherein data is clocked from one register to the next in the ring in only one direction. The apparatus comprises a counter that increments by one each time data is clocked from one register to the next; and logic for comparing a value of the counter with a preselected register address on each count of the counter, wherein the logic for comparing comprises a comparator having an input connected to receive the preselected register address, an input connected to receive the value of the counter, and an output operable to drive a select signal of a multiplexer provided for capturing data from the debug bus at an extraction point when the counter value is equal to the preselected register address.

13 Claims, 3 Drawing Sheets

APPARATUS FOR CAPTURING DATA ON A DEBUG BUS

CROSS-REFERENCE TO RELATED APPLICATIONS

This application is related to U.S. patent application Ser. No. 10/402,034, filed Mar. 28, 2003, entitled AN INTEGRATED CIRCUIT; U.S. patent application Ser. No. 10/402,092, filed Mar, 28, 2003, entitled A BUS INTERFACE MODULE; and U.S. patent application Ser. No. 10/402,122, filed Mar. 28, 2003, entitled SYSTEM AND METHOD FOR VERIFYING HDL EVENTS, all of which are hereby incorporated by reference in their entirety.

BACKGROUND

The increasing complexity of system designs, increased investment required due to this complexity, and shortened product cycles have presented significant challenges to post-silicon design verification of chipsets. This is especially true with respect to high-end cache coherent non-uniform memory access ("ccNUMA") chipsets where systems can be extremely large and complex. Processor post-silicon verification is typically focused on electrical verification at least as much as functional verification due to the large amount of full custom design. Chipsets present a different challenge due to the large number of cells of which they are comprised. Additionally, due to the sheer number of buses, internal bus arbitration, cache coherency control, queue arbitration, etc., in a large ccNUMA server, post-silicon functional verification of such a chipset consumes a greater amount of resources with respect to electrical verification than processors typically consume. Internal observability, while relatively simple in pre-silicon verification, poses a major obstacle to debug and functional test coverage.

Determining when system verification is complete is a second major obstacle to completing post-silicon verification in a time-effective manner. While pre-silicon simulation-based testing depends significantly on labor intensive directed and pseudo-random testing, post-silicon testing has historically depended on observing system operations that imply correct behavior.

Performing post-silicon design verification is an industry standard practice that facilitates exposure of bugs not typically uncovered in pre-silicon verification. Typical post-silicon bugs discovered include those that are manifested after long or at-speed operation of the system, those resulting due to incorrect modeling of hardware and firmware interfaces, those resulting from Register Transfer Language ("RTL") errors that escaped pre-silicon detection, and those resulting from incorrect mapping of RTL-to-silicon (synthesis/physical bugs). Accepted methods of exercising systems to expose post-silicon bugs include running operating systems and software applications targeted for the final system, creating specific directed software tests that stress different portions of the system, and running software tests that create random system operations.

Real-time observability ("RTO") refers to the ability to monitor and capture internal signals in real time either on- or off-chip. While internal signal observability features have been available in some field programmable gate array ("FPGA") architectures and application specific integrated circuits ("ASICs"), they have typically been of limited scope. Limiting factors have been silicon area, wiring constraints, and I/O limitations. In addition, observability features have traditionally been used for debug and not functional test coverage.

Conventionally, logic analyzers are used to capture data, for example, for use in debug procedures. However, implementation of data capture techniques using logic analyzers and the like requires the deployment of additional on-chip registers and/or external connectors. In some situations, this is not possible.

SUMMARY

In one embodiment, an apparatus is disclosed for capturing data on a debug bus comprising N registers connected in a ring, wherein data is clocked from one register to the next in the ring in only one direction. The apparatus comprises a counter that increments by one each time data is clocked from one register to the next; and logic for comparing a value of the counter with a preselected register address on each count of the counters, wherein the logic for comparing comprises a comparator having an input connected to receive the preselected register address, an input connected to receive the value of the counter, and an output operable to drive a select signal of a multiplexer provided for capturing data from the debug bus at an extraction point when the counter value is equal to the preselected register address.

DETAILED DESCRIPTION OF THE DRAWINGS

Figure 1:
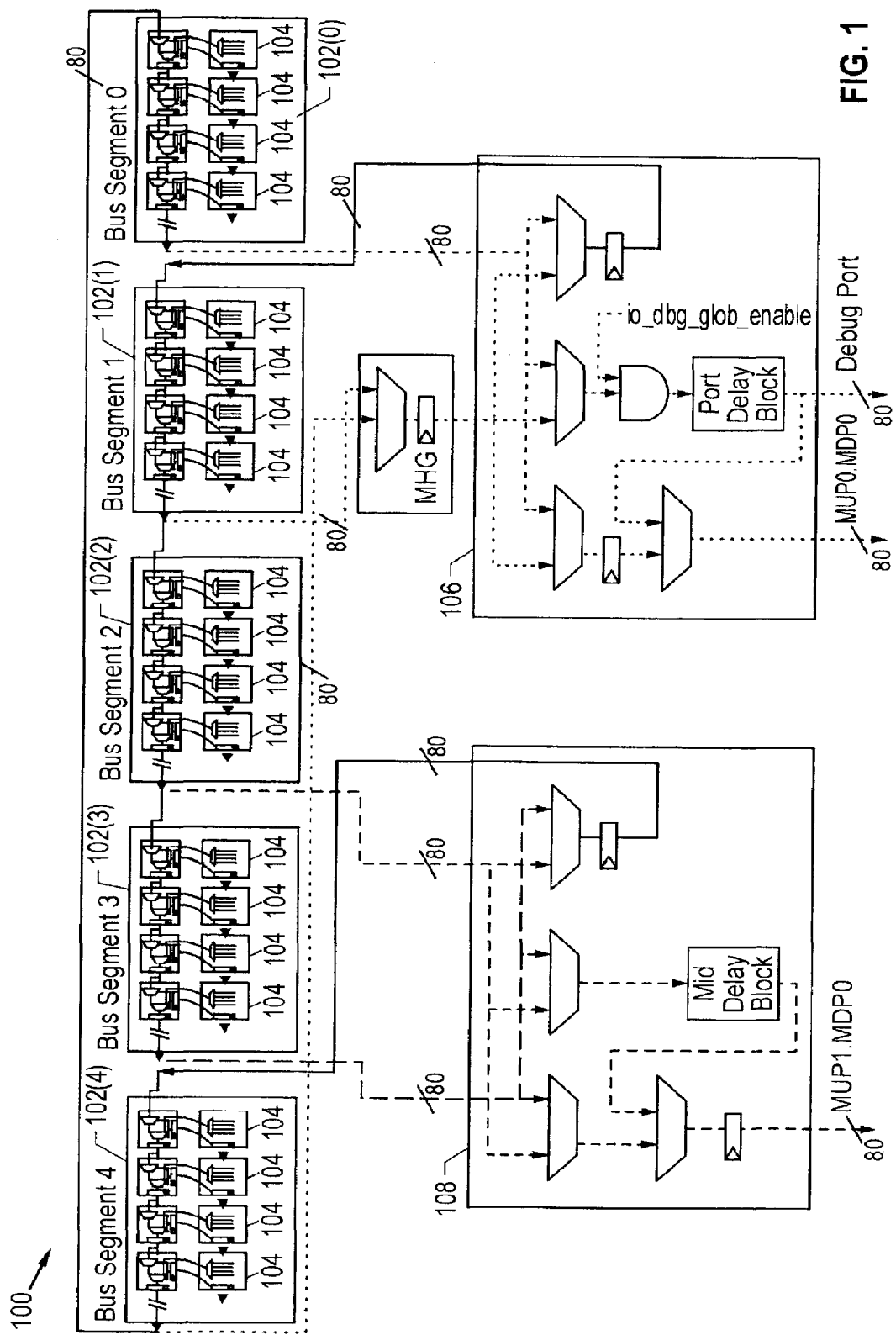
FIG. 1 is a block diagram of a debug bus of one embodiment.

In the drawings, like or similar elements are designated with identical reference numerals throughout the several views thereof, and the various elements depicted are not necessarily drawn to scale.

As illustrated in FIG. 1, in accordance with one embodiment, a debug bus 100 comprises a plurality of bus segments 102(0)–102(4) interconnected in a serial ring and runs at the core clock speed of an IC, e.g., an ASIC, in which the bus is implemented. In one implementation, the debug bus 100 is 80-bits wide; however, in general, the width of the debug bus is consistent with device pin constraints. Moreover, although the illustrated embodiment employs only five bus segments 102(0)–102(4), it will be appreciated that greater or fewer than five bus segments may be implemented as necessary for providing appropriate logical and physical partitioning.

Each bus segment 102(0)–102(4) comprises several access points 104 at which data from surrounding logic is MUXed onto the debug bus 100. As will be described in greater detail below with reference to FIGS. 3 and 4, each access point 104 comprises a standard logic block with a proprietary MUX structure that drives debug data into the access point, which subsequently drives the data onto the debug bus 100.

As illustrated in FIG. 1, two observability ports 106, 108 are defined. In one embodiment, one of the ports, i.e., port 106, is a dedicated debug port. The other port, i.e., port 108, is loaded with functional signals. The debug bus 100 contains debug data that drives both of these ports 106, 108. In one embodiment, the debug port 106 has 80 data pins, plus four strobe pins that are single pumped, with the intention that the port 106 be connected directly to a logic analyzer (not shown).

As previously indicated, the debug port 106 is fed directly from the debug bus 100, which runs at core clock speed and connects the bus segments 106 in a serial ring. The debug bus 100 is segmented so that for any of a plurality of functional areas of an IC in which the bus is implemented, packets to and from the area can be observed in addition to 80 bits of internal state data. Additional details regarding implementation and operation of the debug bus 100 and ports 102, 104 are provided in commonly-assigned, co-pending U.S. patent application Ser. No. 10/402,034, filed Mar. 28, 2003, entitled AN INTEGRATED CIRCUIT, which has been incorporated by reference in its entirety hereinabove.

Figure 2:
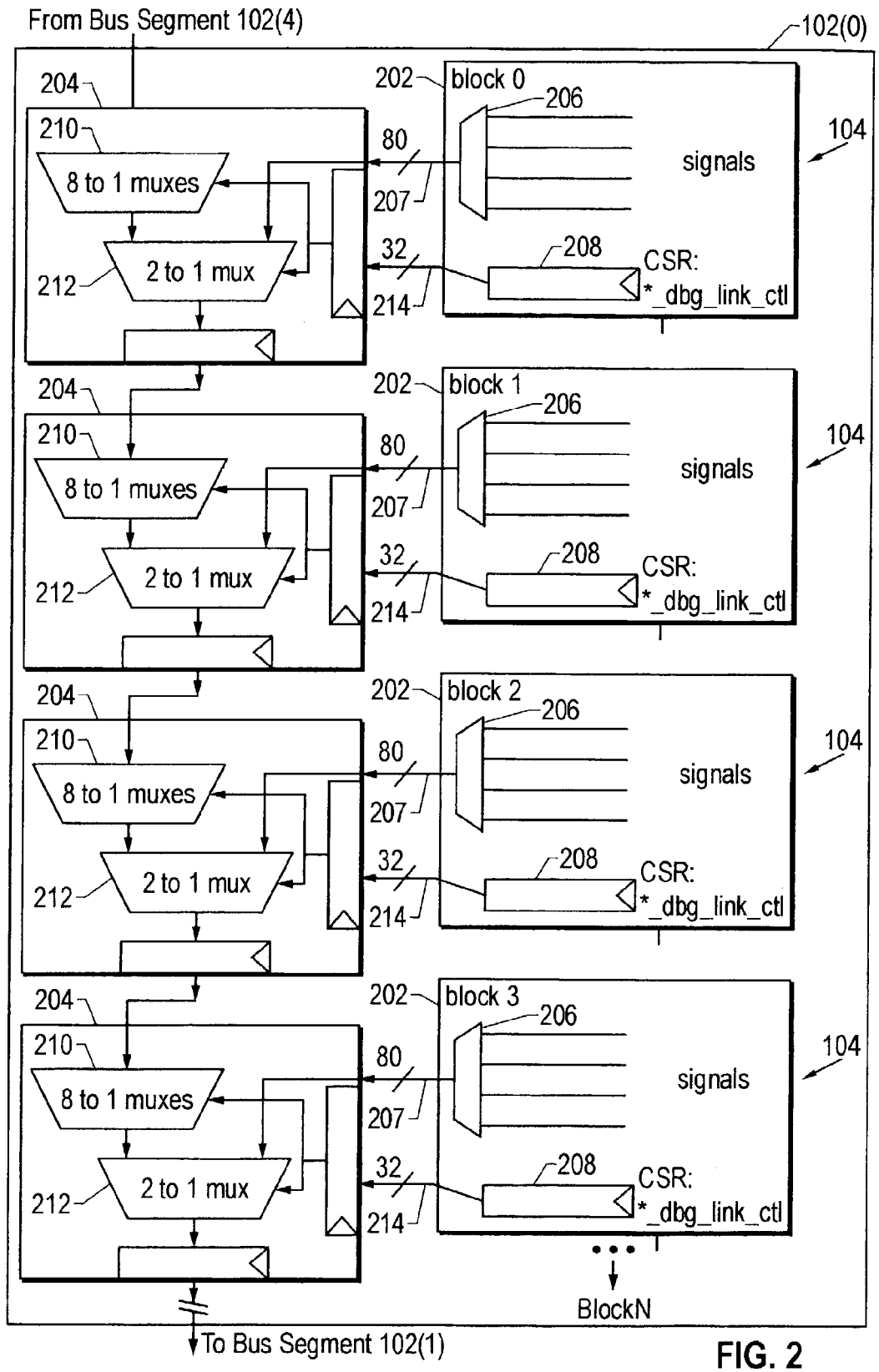
FIG. 2 is a block diagram of a bus segment of the debug bus of FIG. 1.

FIG. 2 is a more detailed block diagram of the bus segment 102(0) of the debug bus 100 illustrated in FIG. 1. As illustrated in FIG. 2, the bus segment 102(0) includes a plurality of access points 104. It should be noted that although only four access points 104 are shown, each bus segment 102(0)–102(4) may comprise greater or fewer access points as necessitated by the number of signals that must be handled by the bus segment.

As shown in FIG. 2, each access point 104 includes a local data intake section 202 and a corresponding debug bus interface block ("DBIB"), or Bus Interface Module, 204 connected thereto. At each access point 104, up to 80 bits of data from surrounding logic ("dbug_read_bus") is provided to the DBIB 204 thereof via a MUX 206 along a bus 207. A control and status register ("CSR") 208 provides a 32-bit MUX select signal ("*_dbg_link_ctl") to MUXes 210, 212 of the corresponding DBIB 204 for purposes that will be described in greater detail below via a bus 214.

Figure 3:
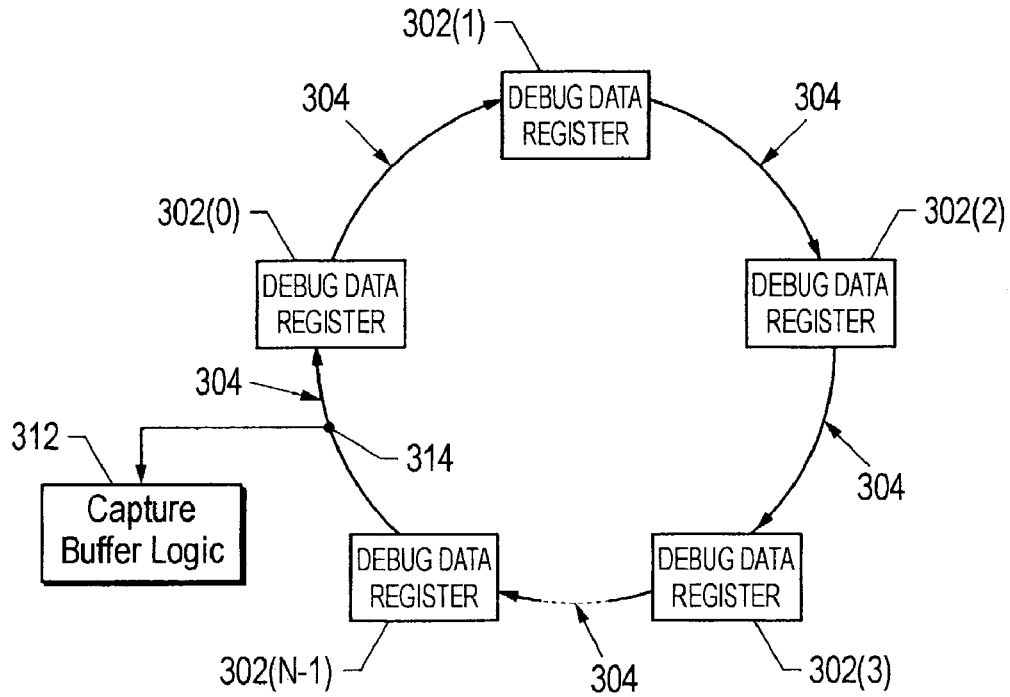
FIG. 3 is a simplified functional block diagram of one embodiment of a debug bus for use as a capture buffer.

FIG. 3 is a simplified block diagram of an embodiment of a debug bus system in accordance with the present invention. Additional details regarding the implementation and operation of the debug bus system 300 are provided in U.S. patent application Ser. No. 10/402,092, filed Mar. 28, 2003, entitled A BUS INTERFACE MODULE, and U.S. patent application Ser. No. 10/402,03, filed Mar. 28, 2003, entitled AN INTEGRATED CIRCUIT, which have been incorporated by reference in their entirety hereinabove.

Referring again to FIG. 3, the system includes N clocked debug data registers 302(0)–302(N–1) connected in a serial ring via a debug bus 304. In the illustrated embodiment, for example, data flows along the bus 304 from the debug data register 302(N–1) to the debug data register 302(0), from the debug data register 302(0) to the debug data register 302(1), from the debug data register 302(1) to the debug data register 302(2), and so on. In one implementation, the debug bus 304 is 80-bits wide; however, in general, the width of the debug bus is consistent with device pin constraints.

As more fully described in the aforementioned U.S. Patent Applications, in one implementation, each debug data register 302(0)–302(N–1) comprises a portion of a DBIB, such as the DBIBs 204, and is connected to the output of the MUX structure (e.g., the output of the MUX 212) thereof. As previously described, a DBIB performs the following three functions: (1) it passes data on from the previous DBIB, (2) it swaps 10-bit blocks of incoming data to other ranges of the debug bus, allowing for more efficient bandwidth utilization; and (3) it MUXes in debug data from surrounding logic (not shown) in 10-bit chunks. As also previously described, each DBIB comprises a standard logic block with a proprietary MUX structure that drives the data into its debug data register and then onto the debug bus via the MUX structure thereof. As illustrated in FIG. 3, in one implementation, the debug bus 304 has 29 such DBIBs, and hence 29 debug data registers 302(0)–302(N–1).

In accordance with one embodiment, and as described in greater detail below with reference to FIG. 4, capture buffer logic 312 is also connected to the debug bus 304 for enabling select data to be captured at an extraction point 314.

Figure 4:
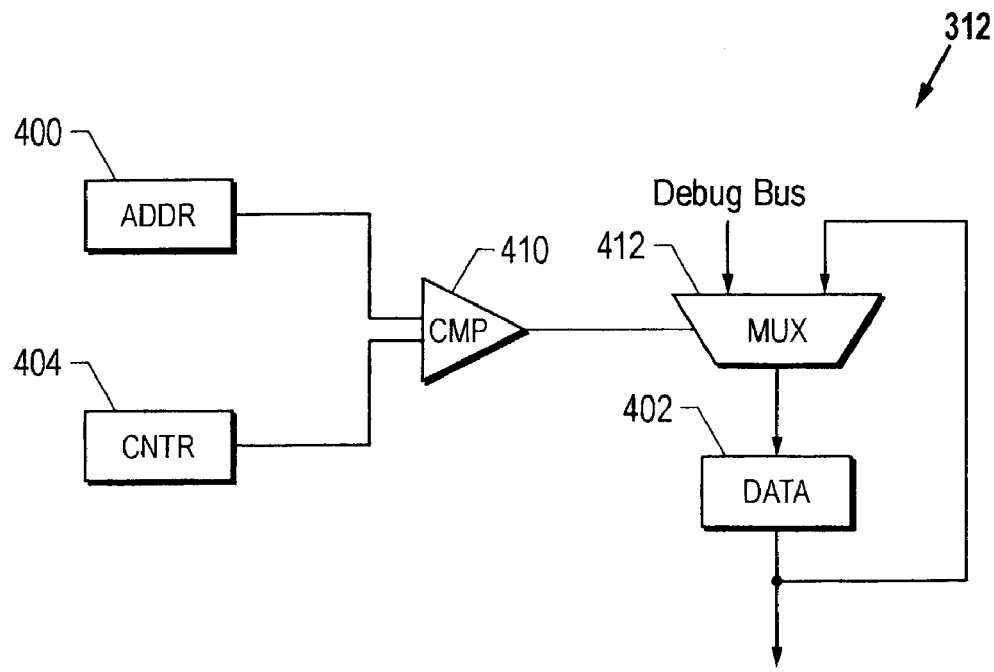
FIG. 4 is block diagram of capture buffer logic for enabling use of the debug bus of FIG. 3 as a capture buffer.

Referring to FIG. 4, the capture buffer logic 312 includes an address ("ADDR") register 400 and a data ("DATA") register 402, each of which is system-addressable, and hence accessible from outside the system as well. The capture buffer logic 312 also includes a clocked counter ("CNTR") register 404 which is incremented by one every clock cycle; that is, each time data is clocked out of one of the debug data registers 302(0)–302(N–1) and into the next along the debug bus 304. Once the value of the CNTR register 404 reaches a maximum count of N–1, it returns to zero and resumes counting. To capture data from a particular one of the debug data registers 302(0)–302(N–1), the "address" of the debug register is written to the ADDR register 400. For purposes of example, it will be assumed that the respective addresses of the debug data registers 302(0)–302(N–1) is identified by the number in the parentheses of the reference numeral designating that register. For example, the address of the debug data register 302(0) is "0", the address of the debug data register 302(1) is "1", and so on.

As previously indicated, the CNTR register 404 counts from zero to N–1 and then begins counting again from zero; hence, value of the CNTR register 404 can be used to sequentially address the debug data registers 302(0) through 302(N–1). In other words, the value of the CNTR register 404 identifies the particular one of the debug data registers 302(0)–302(N–1) whose data is currently accessible at the extraction pont 314 (shown in FIG. 3). To make use of this feature, a comparator 410 compares the value of the CNTR register 404 with the value of the ADDR register 400 once each clock cycle. The output of the comparator 410 is connected to a select pin of a 2×1 MUX 412, one input of which is connected to the debug bus 304 (at the extraction point 314) and the other input of which is connected to the output of the MUX 412.

When the contents of the ADDR register 400 and CNTR register 404 are equal, indicating that the data at the extraction point 314 is the data from the debug data register identified by the address in the ADDR register 400, the signal output from the comparator 410 causes the MUX 412 to output the contents of the debug bus 304 to the DATA register 402. As previously noted, the DATA register 402 is system addressable; accordingly, the contents of the DATA register 402 can be accessed as needed.

An implementation of the invention described herein thus provides method and apparatus for enabling use of a debug bus as a capture buffer. The embodiments described herein capture data like a logic analyzer without the additional on-chip registers and without requiring external pins and connectors. The embodiments shown and described have been characterized as being illustrative only; it should therefore be readily understood that various changes and modifications could be made therein without departing from the scope of the present invention as set forth in the following claims. For example, while the embodiments are described with reference to a debug bus, it will be appreciated that the embodiments may be implemented with any type of bus wherein data is transferred in a ring.

Accordingly, all such modifications, extensions, variations, amendments, additions, deletions, combinations, and the like are deemed to be within the ambit of the present invention whose scope is defined solely by the claims set forth hereinbelow.

What is claimed is:

1. An apparatus for capturing data on a debug bus comprising N registers connected in a ring, wherein data is clocked from one register to the next in the ring in only one direction, the apparatus comprising:
    a counter that increments by one each time data is clocked from one register to the next; and
    logic for comparing a value of the counter with a preselected register address on each count of the counter, wherein the logic for comparing comprises a comparator having an input connected to receive the preselected register address, an input connected to receive the value of the counter, and an output operable to drive a select signal of a multiplexer ("MUX") provided for capturing data from the debug bus at an extraction point when the counter value is equal to the preselected register address.

2. The apparatus of claim 1 further comprising a data register to which the data captured from the debug bus is written.

3. The apparatus of claim 2 wherein the data register is system-addressable.

4. The apparatus of claim 1 wherein the preselected register address is stored in an address register.

5. The apparatus of claim 4 wherein the address register is system-addressable.

6. The apparatus of claim 1 wherein the MUX is connected to receive the data from the debug bus at the extraction point via a first set of inputs thereof.

7. The apparatus of claim 6 wherein when preselected register address equals counter value, the signal output from the comparator to the MUX causes the data at the first set of inputs to be output from the MUX to a system-addressable data register.

8. The apparatus of claim 6 wherein a second set of inputs to the MUX are connected to the outputs of the MUX.

9. The apparatus of claim 1 wherein a minimum value of the counter is zero and a maximum value of the counter is N−1.

10. An apparatus for capturing data on a debug bus comprising N registers connected in a ring, wherein data is clocked from one register to the next in the ring in only one direction, the apparatus comprising:
    means for specifying a register from which data is to be captured;
    a counter for tracking the data from the specified register around the debug bus, the counter incrementing by one each time data is clocked from one register to the nest around the ring;
    means for determining whether the data from the specified register has reached an extraction point, the means for determining comprising logic for comparing a counter value with a specified register address, wherein when the counter value is equal to the specified register address, the data from the specified register has reached the extraction point; and
    means, responsive to the data from the specified register reaching the extraction point of the debug bus, for extracting the data to a data register.

11. The apparatus of claim 10 wherein the data register is system-addressable.

12. The apparatus of claim 10 wherein the means for specifying comprises an address register in which an address of a selected register is stored.

13. The apparatus of claim 12 wherein the address register is system-addressable.

* * * * *

UNITED STATES PATENT AND TRADEMARK OFFICE
CERTIFICATE OF CORRECTION

| | | |
|---|---|---|
| PATENT NO. | : 7,107,394 B2 | Page 1 of 1 |
| APPLICATION NO. | : 10/402628 | |
| DATED | : September 12, 2006 | |
| INVENTOR(S) | : Tyler James Johnson | |

It is certified that error appears in the above-identified patent and that said Letters Patent is hereby corrected as shown below:

In column 3, line 44, delete "10/402,03" and insert -- 10/402,034 --, therefor.

In column 6, line 16, in Claim 10, delete "nest" and insert -- next --, therefor.

Signed and Sealed this

Sixth Day of January, 2009

JON W. DUDAS
*Director of the United States Patent and Trademark Office*